United States Patent [19]

Hawkins

[11] Patent Number: 4,809,733
[45] Date of Patent: Mar. 7, 1989

[54] FAIL-SAFE GATE VALVE WITH SEPARATED ACTUATORS

[75] Inventor: Herman H. Hawkins, Katy, Tex.
[73] Assignee: National-Oilwell, Houston, Tex.
[21] Appl. No.: 41,269
[22] Filed: Apr. 22, 1987
[51] Int. Cl.[4] .............................................. F16K 31/14
[52] U.S. Cl. .................................. 137/236.1; 251/14; 251/62; 251/63.5; 92/60
[58] Field of Search ..................... 251/14, 61, 61.3, 62, 251/63, 63.5, 326, 327, 129.03; 92/60; 137/236.1

[56] References Cited

U.S. PATENT DOCUMENTS

| Re. 30,115 | 10/1979 | Herd et al. ........................ 251/63.6 |
| 1,305,365 | 6/1919 | Hopkins . |
| 2,365,650 | 12/1944 | Shaw et al. ........................ 251/61.3 |
| 2,459,689 | 1/1949 | Dickey et al. ...................... 251/14 X |
| 2,523,826 | 9/1950 | Heinzelman ....................... 251/14 X |
| 2,630,829 | 3/1953 | Shafer ................................... 251/14 |
| 2,715,009 | 8/1955 | Beckley ............................. 251/61.3 |
| 2,991,042 | 7/1961 | Natho .................................. 251/14 |
| 3,767,160 | 10/1973 | McCollum .......................... 251/61.3 |
| 3,771,626 | 11/1973 | Palmer ................................ 92/60 X |
| 4,230,299 | 10/1980 | Pierce, Jr. ............................ 251/14 |
| 4,294,284 | 10/1981 | Herd ................................... 137/613 |
| 4,436,279 | 3/1984 | Bonds et al. ....................... 251/14 X |

FOREIGN PATENT DOCUMENTS 2133472  7/1984  United Kingdom .

Primary Examiner—John Rivell
Attorney, Agent, or Firm—R. J. Bunyard; R. H. Johnson; L. A. Fillnow

[57] ABSTRACT

A fail-safe gate valve assembly having a power actuator and a spring actuator disposed on opposite sides of a flowline. The assembly includes a valve body, a valve chamber including a gate movable between open and closed positions for controlling fluids through the flowline, a first housing containing the power actuator disposed on one side of the valve body and a second housing containing the spring actuator disposed on the opposite side of the valve body. The power actuator urges the gate from one to another of the positions. The spring actuator urges the gate from the other to the one of the positions in event a power loss occurs to the power actuator. The spring actuator may include an override thereby allowing the override to be used to open and close the gate valve without compressing the springs.

18 Claims, 8 Drawing Sheets

FAIL-SAFE GATE VALVE WITH SEPARATED ACTUATORS

BACKGROUND OF THE INVENTION

This invention relates to a fail-safe gate valve for controlling the flow of fluids through a flowline and a method for operating the gate valve. More specifically, the invention relates to a fail-safe gate valve having a power actuator and a spring actuator located in separate housings with the housings disposed on opposite sides of the flowline.

The fail-safe gate valve of the present invention can be used anywhere there is a need for a valve with a fail-safe mechanism both subsea and on conventional land operations. The applications for the present invention include, but are not limited to Christmas trees, blowout preventer (BOP) stack valves, production valves and manifold valves.

A typical gate valve includes a valve body having a flowway through which fluids pass and a valve chamber intersecting the flowway. A valve element or gate is disposed within the valve chamber for reciprocation across the flowway wherein flow is permitted when a hole located in the gate is positioned within the flowway. Flow is blocked when the hole in the gate is shifted from the flowway. The gate is reciprocated within the valve chamber by a power actuator which may be hydraulic, pneumatic or electrical for opening or closing the gate valve.

In oilfield operations having long unattended service, it is desirable for gate valves to have fail-safe operators. A fail-safe operator returns a gate valve to a safe (normally closed) position when a loss of hydraulic, pneumatic or electrical power occurs. The fail-safe operator contains a spring actuator which ordinarily is disposed within the same housing containing the power actuator.

Disposing the spring actuator and the power actuator in the same housing makes the actuator large and can cause spacing and handling problems when installing gate valves. Some of these problems occur because of the additional housing length required when the spring actuator is included. For large bore Christmas trees, the actuator housing may be so large that it extends beyond the guide frame. In such cases, the probability of damage to the actuators is increased, the Christmas trees must be oriented to prevent interference between actuators caused by closer spacing in template systems, and the Christmas trees will be poorly balanced for handling. Spacing is also becoming more of a problem with increased usage of remote operated vehicles (ROVs) in place of divers to perform work on subsea systems.

The weight and size of the actuators increase as the flow way size of the gate valve increases. The increased weight and size of the actuators displaces the center of gravity of a Christmas tree. The offset frequently is of such magnitude that large valve systems cannot be safely handled. For example, Christmas trees with large bore block valves cannot be landed onto a wellhead without the addition of counterweights. Of course, increased weight of the counterweights further aggravates the handling problem.

Reducing the size and length of the actuators in fail-safe gate valves has been a goal of designers in the oil industry for a number of years. Some have attempted to reduce the length of the housing by changing the type of spring used, such as substituting conical compression springs or belleville washers. While reducing the length of the housing, nonstandard spring types are expensive to develop and manufacture, especially in small quantities.

I have determined that a solution to the above problem is to separate the power actuator from the spring actuator. The power actuator and the spring actuator are each contained in separate housings with the housings disposed on opposite sides of the gate valve. By placing the two actuators in different housings, the length of each housing is considerably shortened. Furthermore, by placing the housings on opposite sides of the gate valve, the offset in the center of gravity has been reduced.

With my novel design, I have further discovered that a double acting override can be incorporated into my spring actuator and the gate valve may be operated without the use of the power actuator. This would result in a reduction of input force or torque to operate the gate valve, since the springs will not be compressed during operation of the valve with the override.

BRIEF SUMMARY OF THE INVENTION

This invention relates to a fail-safe gate valve having separated power and spring actuator assemblies and a method for controlling the flow of fluids through the gate valve. The gate valve includes a valve body, a valve chamber located in the valve body and a gate disposed in the valve chamber. The gate is movable between open and closed positions for controlling the flow of fluids through the gate valve. First and second housings containing a power actuator and a spring actuator respectively are diametrically disposed on the gate valve. The power actuator located in the first housing engages the gate and urges the gate to move from a first position to a second position. In the event a power loss occurs or the power actuator is deactivated, the spring actuator located in the second housing urges the gate from the second position to the first position.

In another embodiment of my invention, the spring actuator includes a double-acting override. In this embodiment, the valve chamber includes a tail rod for engaging the gate and the spring actuator includes a stem having first and second ends. A spring retainer is connected to a compression plate with the first end of the stem threadably connected to the inner bore of the spring retainer and also rotatably connected to the tail rod.

In this second embodiment including the double-acting override, two modes of operating the gate valve are possible. In the first or normal mode of operation, the gate valve is operated as described above. The gate is laterally moved from the first position to the second position by the power actuator located in the first housing. The gate simultaneously engages and laterally moves the tail rod. The tail rod causes the stem to be laterally moved without rotation, thereby, causing the compression plate to compress the spring of the spring actuator located in the second housing. In the event of power loss or if the power actuator is deactivated, the spring actuator urges the gate to move from the second position to the first position.

In a second or manual mode of operation, the gate is operated without use of the power actuator in the first housing. The stem is rotated in a first direction and laterally moved, thereby, simultaneously moving the tail rod which engages and urges the gate to move from the first position to the second position. Since the stem is rotated, the compression plate is not moved and, therefore, the spring of the spring actuator is not compressed. The gate subsequently may be moved from the second position to the first position by rotating the stem in the opposite direction.

It is a principal object of my invention to provide a fail-safe gate valve into having actuator assemblies of reduced size and length.

Another object of my invention is to include a double-acting override in the spring actuator.

An advantage of my invention is reduced damage to the gate valve actuators during handling and the increased space between Christmas trees on wellheads due to the reduction in length of the actuator assemblies.

Another advantage of my invention is the reduction of the offset in the center of gravity and reduction of weight for Christmas trees incorporating my gate valve assemblies.

The above and other objects, features and advantages of my invention will become apparent upon consideration of the detailed description and appended drawing.

DETAILED DESCRIPTION OF THE PREFERRED EMBODIMENTS

Figure 1:
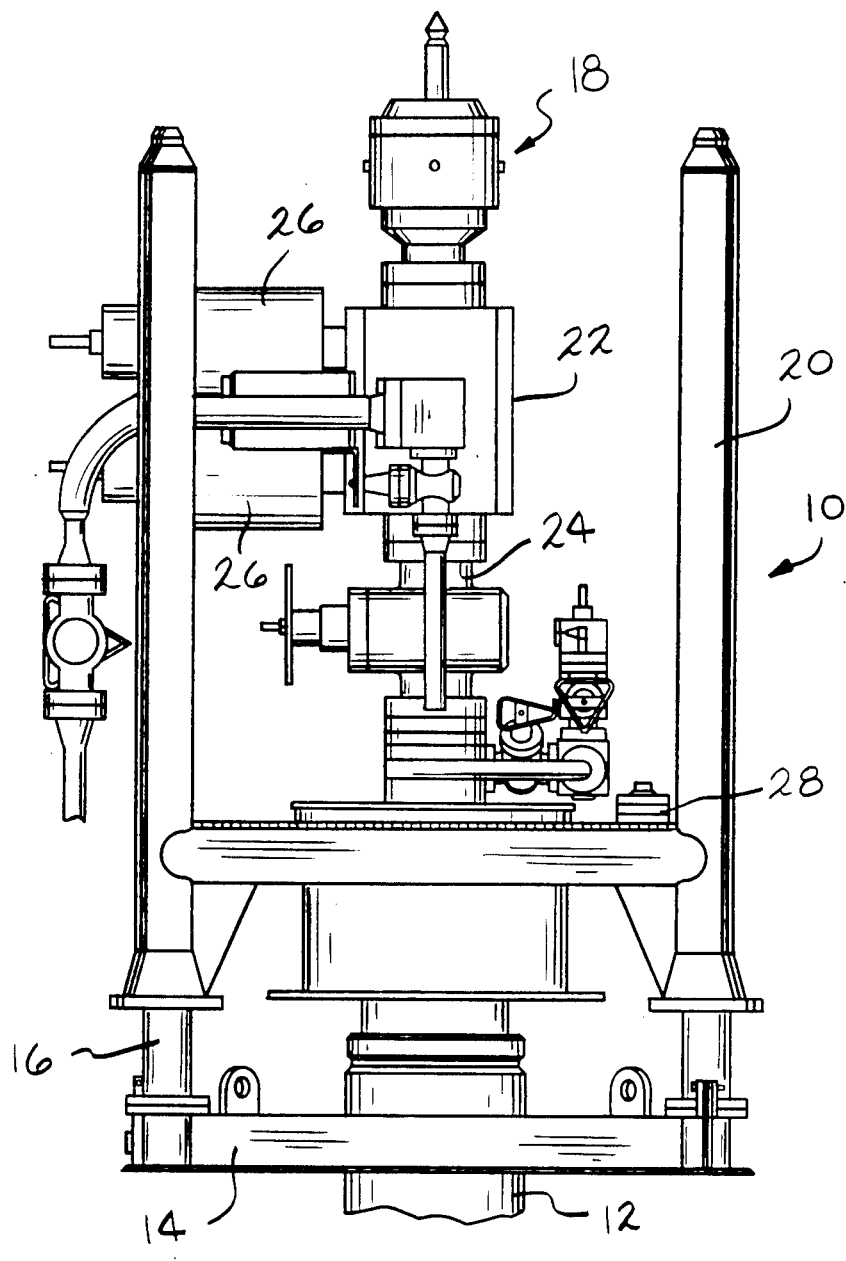
FIG. 1 is an elevational view of a Christmas tree on a wellhead incorporating prior art fail-safe gate valves.

Reference numeral 10 in FIG. 1 generally refers to a wellhead completion apparatus installed on a wellhead 12. A guide frame template 14 having upstanding guide posts 16 receives guides 20 for mounting a Christmas tree 18 onto wellhead 12. Christmas tree 18 includes two fail-safe gate valves 22 mounted on a production flowline 24. Two prior art actuator assemblies 26 having a hydraulic actuator and a spring actuator located in a common housing are mounted at one side of gate valves 22. As shown, actuators 26 extend well beyond the outer periphery of template 14. This increases the likelihood of damage to actuators 26 during handling and installation. It also will be appreciated the center of gravity of Christmas tree 18 will be offset to the left because of the manner actuators 26 are disposed relative to flowline 24. This offset frequently is counterbalanced by installation of counterweights 28 on the opposite side of flowline 24. Of course, this additional weight further aggravates handling problems associated with Christmas trees incorporating prior art fail-safe gate valve assemblies.

Figure 2:
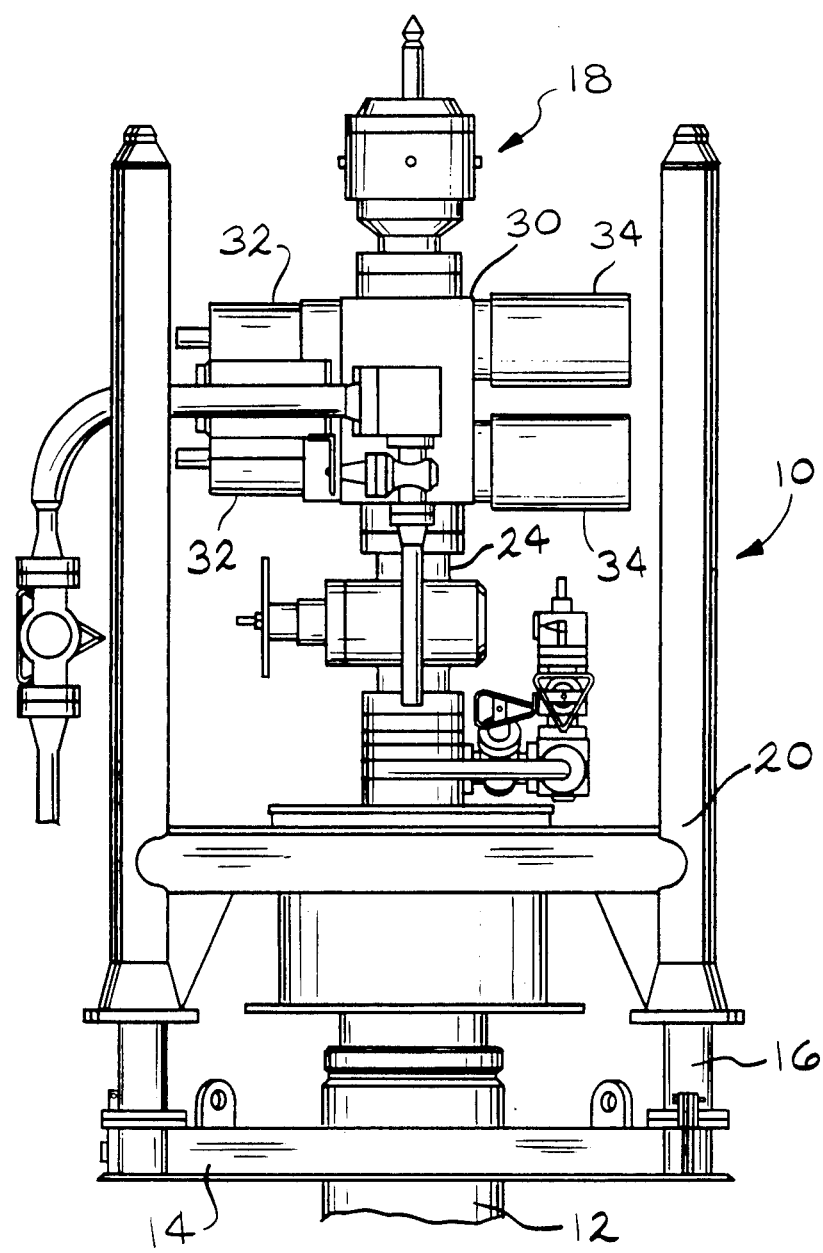
FIG. 2 is an elevational view of a Christmas tree on a wellhead incorporating fail-safe gate valves embodying my invention.

FIG. 2 shows Christmas tree 18 incorporating a fail-safe gate valve 30 embodying my invention. Unlike prior art valve actuators 26 illustrated in FIG. 1 where both actuators are located in the same housing, my invention separates a power actuator 32 and a spring actuator 34 which are disposed on opposite sides of gate valve 30. Since only one actuator is located in each housing, the length of each housing is reduced. Unlike the prior art, my entire gate valve assembly is within the periphery of template 14. Actuators 32 and 34 are disposed such that the assembly is nearly symmetrical about flowine 24. Counterweights are not required.

Figure 3:
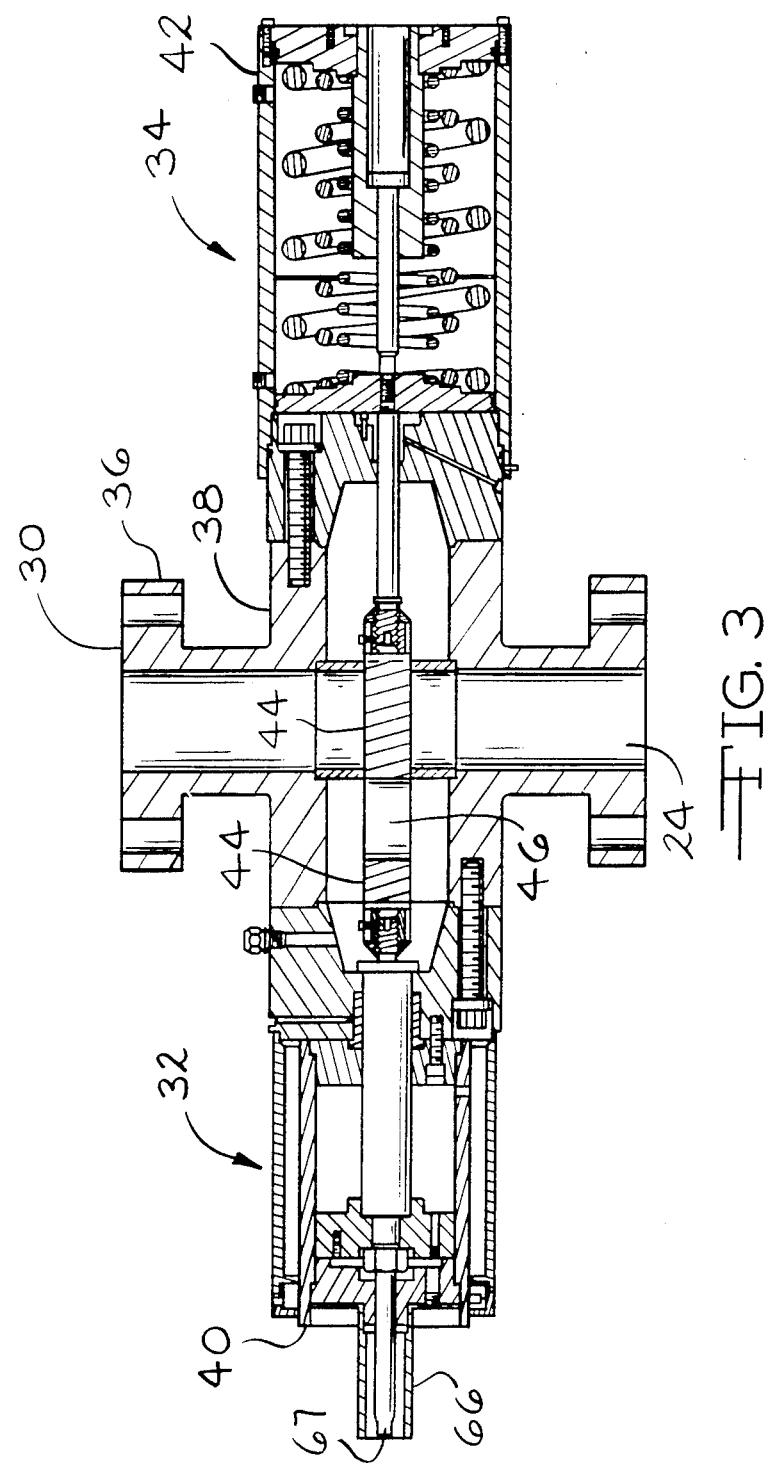
FIG. 3 is a longitudinal section of a gate valve embodying my invention.

FIG. 3 shows a longitudinal section of the gate valve assembly shown in FIG. 2. The assembly includes valve 30 and actuators 32 and 34 disposed in line and on opposite sides of flowline 24. Valve 30 includes a valve body 36, a valve chamber 38 and a gate 44 disposed in chamber 38 movable between open and closed positions for controlling flow of fluids through flowline 24. Gate 44 includes an opening 46 for allowing passage of fluids. When gate 44 is uged to the right by power actuator 32, gate 44 moves from the closed position shown in FIG. 3 to an open position when opening 46 is aligned within flowline 24.

Figure 4:
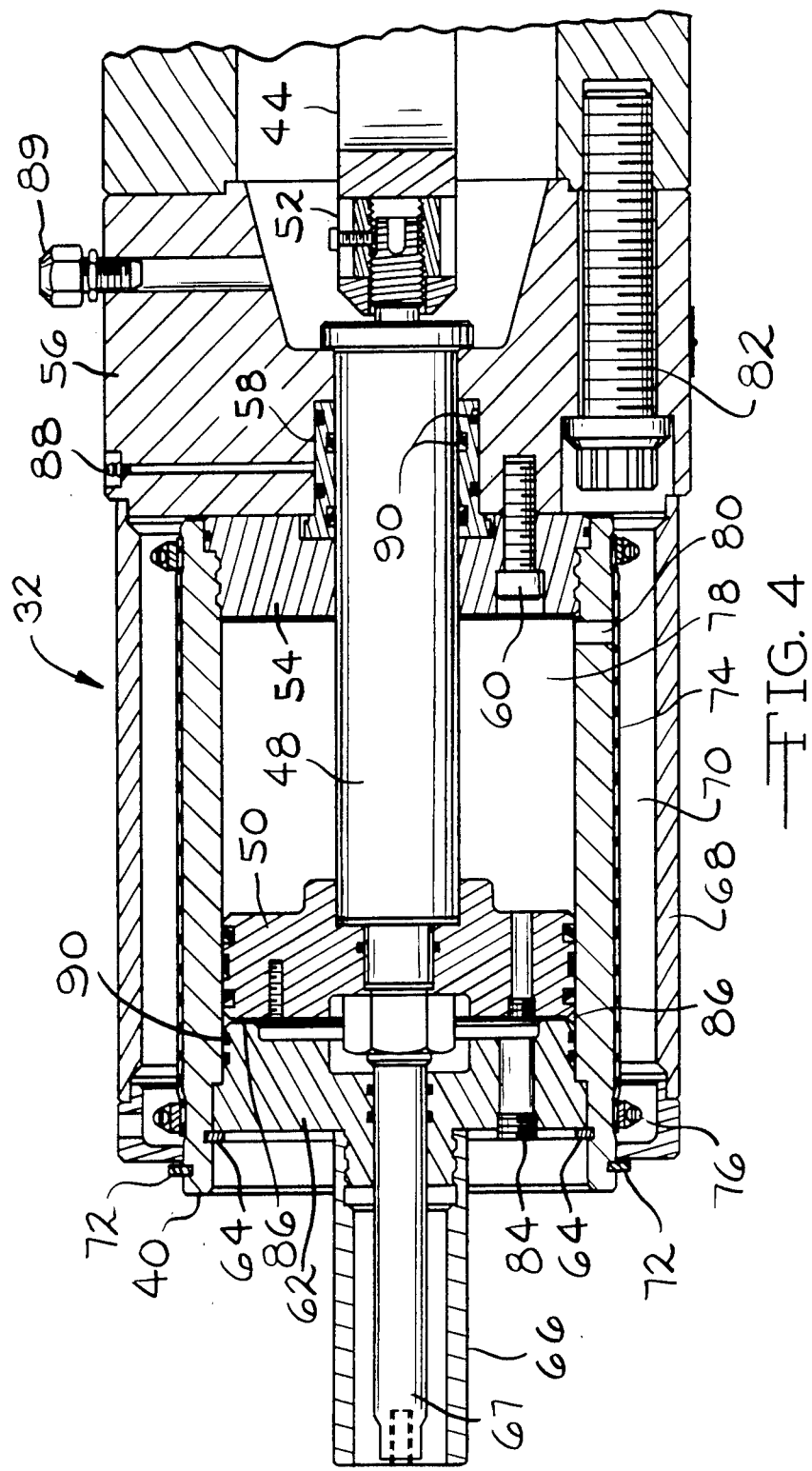
FIG. 4 is a detailed longitudinal section of the power actuator shown in FIG. 3.

FIG. 4 shows details of hydraulically operated actuator 32. Actuator 32 includes a rod 48 connected to a piston 50 and engagable with gate 44 via a connector 52. Actuator 32 is closed on its inside end by a cap 54, a bonnet 56 and a gland 58. Cap 54 is connected to bonnet 56 by a plurality of screws 60. The outside end of actuator 32 is closed by a cap 62 held in place by a retainer ring 64. Outer end 67 of rod 48 is protected by a rod protector 66. A sleeve 68 for forming a reservoir 70 is mounted on the outside of a housing 40. Sleeve 68 is held onto housing 40 by a retainer ring 72. Reservoir 70 includes an expandable bladder 74 mounted onto the outside of housing 40 by clamps 76 and is connected to chamber 78 of actuator 32 via a fluid port 80. Actuator 32 is attached to valve chamber 38 by a plurality of screws 82. Actuator 32 is also connected to a hydraulic power source (not shown) by connecting hydraulic lines to a port 84. Gate valve 30 is moved to its open position by supplying pressurized hydraulic fluid to a chamber 86, thereby, urging gate 44 to laterally move via rod 48 and piston 50 from a closed position to an open position. When operator 32 is energized during its power stroke, fluid and/or air in chamber 78 is exhausted through port 80 into bladder 74 thereby causing bladder 74 to expand into reservoir 70. Leakage of fluids is prevented by various seals 90 located in gland 58. Gate 44 is lubricated through a grease fitting 89.

Figure 5:
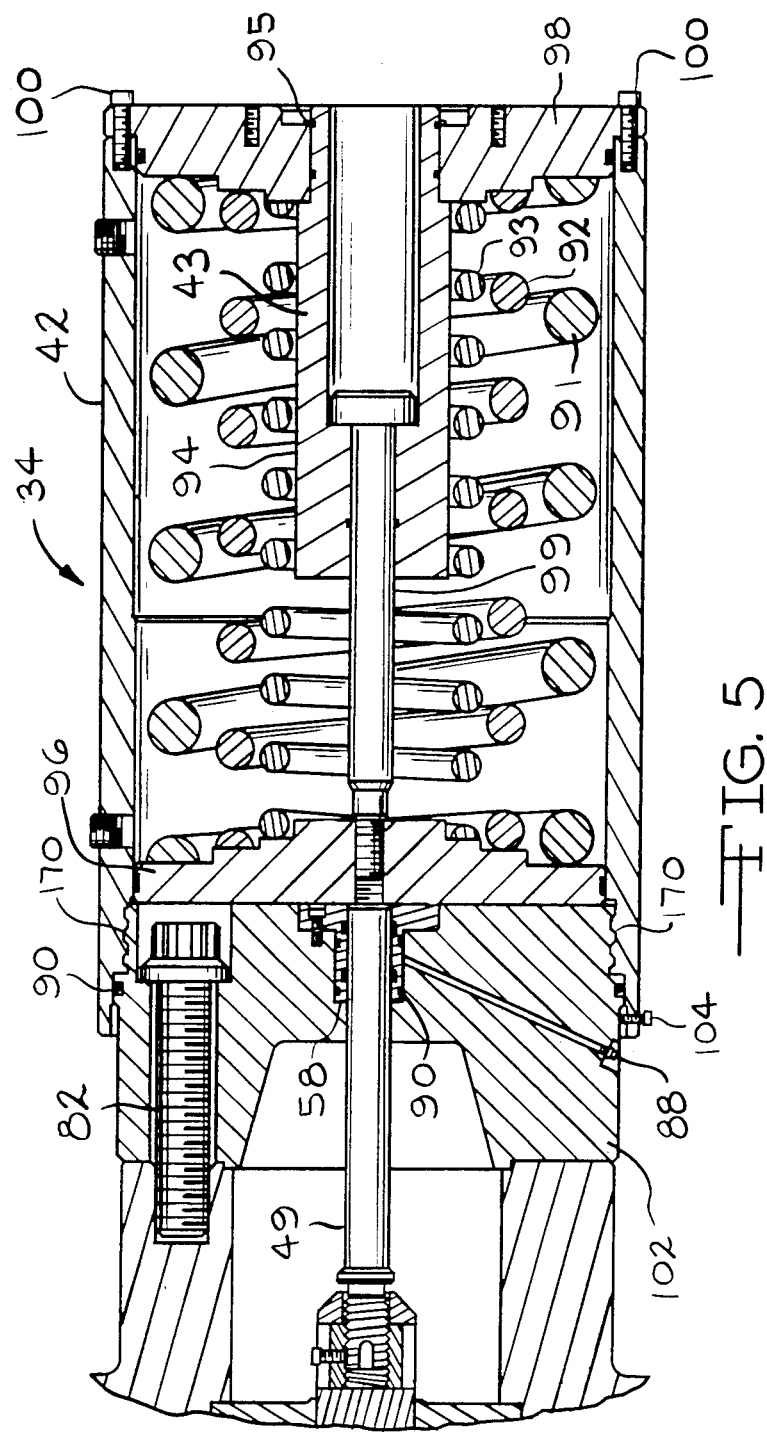
FIG. 5 is a detailed longitudinal section of the spring actuator shown in FIG. 3.

FIG. 5 shows details of spring actuator 34 which includes a housing 42 and a removable cartridge 43. Cartridge 43 includes one or more springs for shifting gate 44 in the event there is a power loss to or deactivation of actuator 32. Cartridge 43 includes springs 91, 92, and 93 which preferably are retained in a precompressed state by a spring rod 99, a spring retainer 94, a spring compression plate 96, a retaining ring 95, and a cap 98 which is attached to housing 42 by a plurality of screws 100. The inside end of housing 42 is closed by a cap 102 connected to housing 42 by a thread 170. Actuator 34 is connected to valve chamber 38 by screws 82. As actuator 32 is energized and urges gate 44 from a closed position to an open position, a tail rod 49 contacts and moves compression plate 96 thereby compressing springs 91, 92 and 93. In event power to actuator 32 is lost, gate valve 30 is restored to a safe position as gate 44 is moved from an open position to a closed position by springs 91, 92, and 93.

Spring actuator 34 in FIG. 5 includes three different springs 91, 92 and 93. For large bore gate valves, particularly subsea gate valves operating at great depths, a single large spring may not be sufficient to return a gate to a safe position in event of power loss. If multiple springs are required for additioanl force, they may be concentrically disposed around retainer 94 as shown in FIG. 5.

Figure 6:
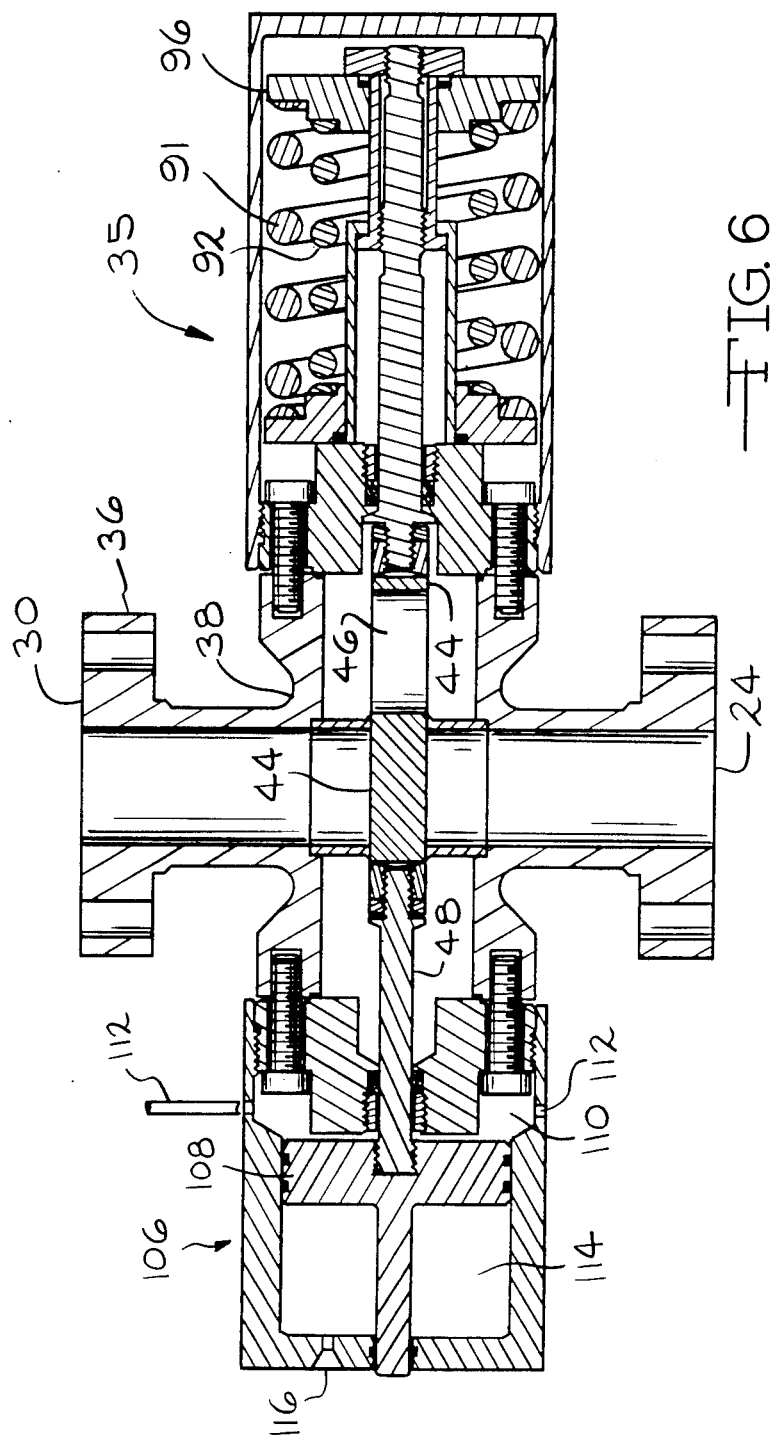
FIG. 6 is a longitudinal section similar to that sown in FIG. 3 illustrating another embodiment of my invention.

FIG. 6 shows another embodiment of a fail-safe gate valve having the power actuator separated from the spring actuator. Components in subsequent embodiments identical to those previously described will be given the same reference numerals as previously used. A power actuator 106 shown in FIG. 6 includes a piston 108 and a chamber 110 for receiving pressurized fluid through a port 112 from a hydraulic power source (not shown). Actuator 106 is operated by supplying pressurzied fluid into chamber 110. Piston 108 is moved to the left with fluid being exhausted from a chamber 114 through an exhaust port 116 to a fluid reservoir (not shown) thereby urging gate element 44 from a closed position as shown to an open position. Compression plate 96 contained in a spring actuator 35 is correspondingly moved thereby compressing springs 91 and 92. If a power loss occurs to or actuator 106 is deactivated, springs 91 and 92 in spring actuator 35 will urge gate 44 from an open position to a closed position.

Figure 7:
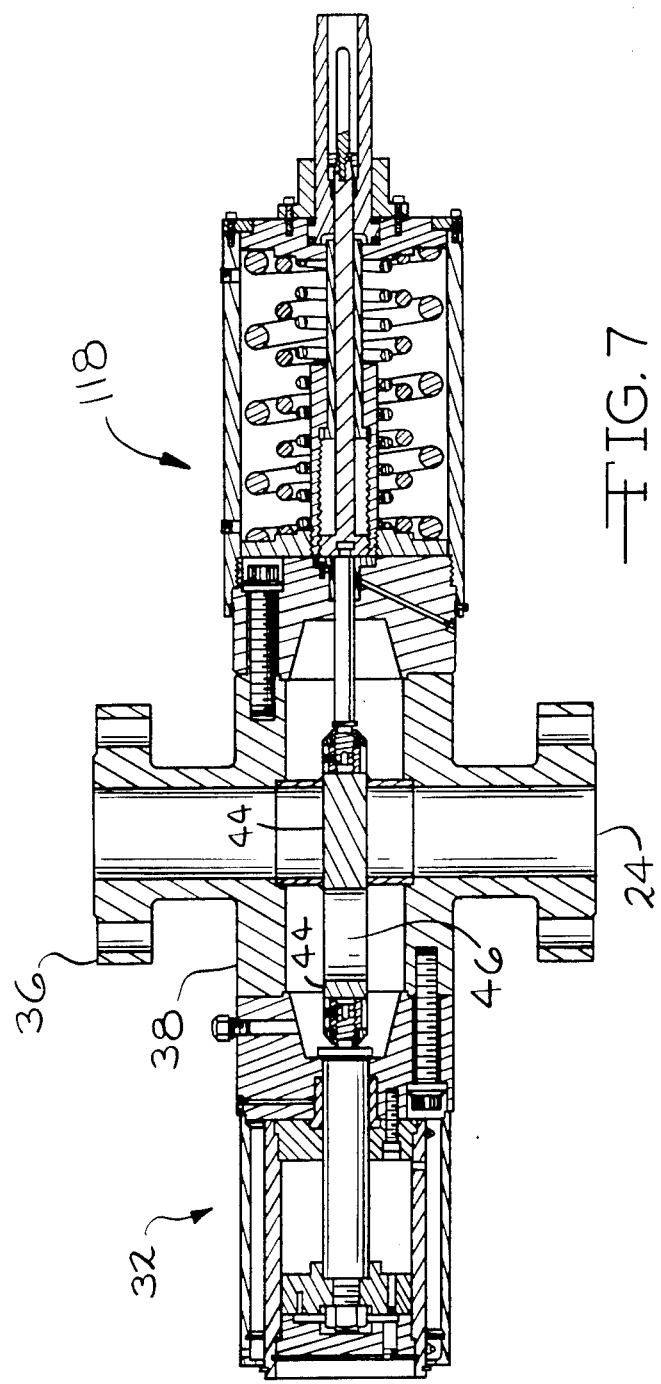
FIG. 7 is a longitudinal section similar to that shown in FIG. 3 showing a spring actuator including a double-acting override.

FIG. 7 shows a further embodiment of a fail-safe gate valve assembly including a double-acting override. Power actuator 32 shown in FIG. 7 is identical to actuator 32 shown in FIGS. 3 and 4 except rod indicator 67 and rod protector 66 have been removed. An actuator 118 includes the double acting override.

Figure 8:
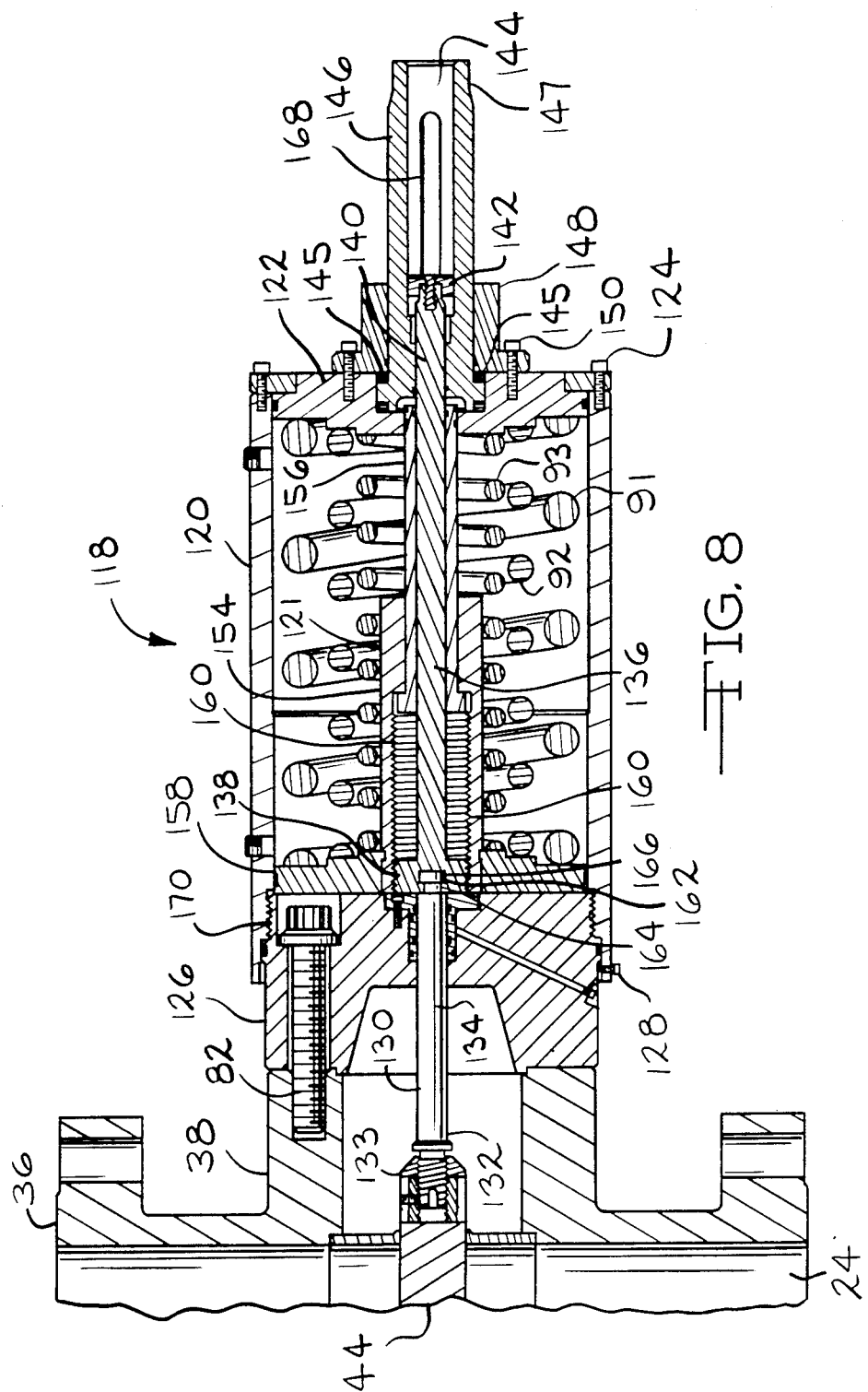
FIG. 8 is a detailed longitudinal section of the spring actuator shown in FIG. 7.

FIG. 8 shows details of spring actuator 118 shown in FIG. 7. Actuator 18 includes a housing 120 and a replacable cartridge 121. Cartridge 121 includes a stem 136 having a first end 138 and a second end 140, a key 142, a stem protector 146 having an inner bore 144 and being rotatably mounted by thrust bearings 145 and held by a retainer 148, retainer 148 being fastened to a cap 122 by screws 150 with cap 122 being fastened to housing 120 by screws 124, a spring retainer 154, an extension tube 156, a spring compression plate 158, and springs 91, 92, and 93. Housing 120 is closed on its inside end by a cap 126 and detachably connected thereto by thread 170. As previously described for actuator 34, actuator 118 is attached to valve chamber 38 by screws 82. Actuator 118 also includes a tail rod 130 having a first end 132 connected by a connector 133 to gate 44 and a second end 134 rotatably connected to first end 138 of stem 136. Second end 140 of stem 136 is keyed to stem protector 146 by key 142. Key 142 is shiftably received within inner bore 144 of stem protector 146. Enlarged first end 138 of stem 136 is threadably connected to a threaded inner bore 160 of spring retainer 154. Second end 134 of tail rod 130 has a short T-shaped portion 162 having a reduced diameter 164. T-shaped portion 162 is recieved within a T-slot 166 cut into the inside of enlarged end 138 of stem 136. T-slot 166 and threads 160, the purpose which will be explained in more detail later, provide translational motion to stem 136 with or without rotational motion.

Two modes of operation are possible with spring actuator 118 shown in FIG. 8. Actuator 118 may be used as a fail-safe operator as previously described in event a power loss occurs to power actuators 32 or 106, or actuator 118 can be manually operated to open or close gate valve 30 completely bypassing power actuators 32 or 106. In the first mode of operation, gate 44 is moved from a first position to a second position using power actuators 32 or 106 as previously described. When gate 44 moves from the first position to the second position, gate 44 engages tail rod 130 simultaneously moving tail rod 130 to the right. Tail rod 130 simultaneously urges stem 136 to the right. As described above, enlarged first end 138 of stem 136 is threadably connected to the inner bore of spring retainer 154 by threads 160. Compression plate 158 is connected to the outer surface of spring retainer 154. Accordingly, compression plate 158 is simultaneously urged to the right by stem 136 via spring retainer 154 thereby compressing springs 91, 92 and 93. If a power loss occurs to actuators 32 or 106, springs 91, 92 and 93 urge gate 44 from the second position back to the first position.

Now, I will describe how actuator 118 is manually used to operate the gate valve and bypassing the power actuator without compressing springs 91, 92 and 93. Rotational motion is applied to stem protector 146 by a maintenance person or in subsea applications using a diver or an ROV by engaging flats 147 at the end of stem protector 146 with a tool or wrench. Since second end 140 of stem 136 is keyed by key 142, stem 136 is rotated by rotating stem protector 146. However, since first end 138 of stem 136 is threadably connected to spring retainer 154, rotation of stem 136 also causes translational motion to stem 136 as well. This is the purpose of T-shaped connector 162 on tail rod 130. Because the translational motion is along the thread 160, spring compression plate 158 does not translate, and springs 91, 92 and 93 are not compressed. Connector 162 is received in T-shaped slot 166 in end 138 of stem 136 thereby permitting rotation of stem 136 relative to tail rod 130. As stem protector 146 is rotated, tail rod 130 is urged to the right via rotation and translational movement of stem 136. Tail rod 130 urges gate 44 from a first position to a second position. If a change to the gate valve is subsequently required, gate 44 is urged from the second position back to the first position by rotating stem protector 146 an equal amount in the opposite direction.

In another embodiment, key 142, stem protector 146, retainer 148, bearings 145 and screws 150 could all be eliminated from cartridge 121. In this embodiment, second end 140 of stem 136 would project from end cap 122. Rotational and translational motion to stem 136 is caused by engaging end 140 with a tool or wrench and rotating in a first direction to urge gate 44 from the first position to the second position. If a change to the gate valve is subsequently required, end 140 would be rotated an equal amount in the opposite direction to urge gate 44 from the second position back to the first position.

It will be understood various modifications can be made to my invention without departing from the scope and spirit of it. For example, even though only hydraulically operated power actuators have been shown, pneumatic or electrical actuators could be used with my invention. A diametrically disposed spring actuator of my invention may include a double-acting override. Without the override, the spring actuator returns the gate valve to a "safe" position in event of a power loss to the power actuator. With the override, the spring actuator can return the gate valve to a "safe" position in event of a power loss to the power actuator, or the override can be used to manually open and close the gate valve, without compressing the springs to completely bypass the power actuator. My gate valve assembly could be used anywhere where there is a need for a fail-safe mechanism, both land and subsea. Applications requiring unattended service include, but not limited to, Christmas trees, BOP stack valves, production valves and manifold valves. Therefore, the limits of my invention should be determined from the appended claims.

I claim:

1. A combination comprising:
a valve body disposed on a flowline,
a valve chamber located within said valve body,
a gate disposed within said valve chamber and movable between open and closed positions for controlling the flow of fluids through said flowline,
first and second housings disposed on opposite sides of said valve body,
said first housing including an outer sleeve and a power actuator for urging said gate from said closed to said open position,
said sleeve spaced from the outer surface of said first housing for forming a reservoir for receiving exhausted fluid and air from said first housing as said gate is moved from said closed to said open position, said second housing including a spring actuator for urging said gate from said open to said closed position thereby closing said valve body in the event a power loss occurs or said lower actuator is deactivated.

2. A combination as set forth in clam 1 wherein said power actuator is hydraulically operated.

3. A combination as set forth in claim 1 wherein said valve body is disposed on a subsea flowline and said reservoir includes a bladder for receiving said exhausted fluid and said air.

4. A combination as set forth in claim 1 wherein said spring actuator includes a rod, a compression plate connected to said and a spring, wherein said plate compresses said spring when said gate moved from said closed to said open position.

5. A method of operating a fail-safe valve comprising:
a valve body disposed on a flowline, a valve chamber located within said valve body, a gate disposed within said chamber and movable between open and closed positions for controlling the flow of fluids through said flowline,
first and second housings disposed on opposite sides of said valve body, said first housing including an outer sleeve and a power actuator for urging said gate from said closed to said open position, said sleeve spaced from the outer surface of said first housing for forming a reservoir, said second housing including a spring actuator for urging said gate from said open to said closed position, the method comprising the steps of:
laterally moving said gate from said closed to said open position by said power actuator and exhausting fluid and air from said first housing into said reservoir,
laterally moving said gate from said open to said closed position by said spring actuator thereby closing said valve body in the event a power loss occurs or said power actuator is deactivated.

6. A method of operating a fail-safe gate valve comprising:

a valve body disposed on a flowline, a valve chamber located within said valve body, said valve chamber including a tail rod and a gate movable between open and closed positions for controlling the flow of fluids through said flowline,
first and second housings disposed on opposite sides of said valve body, said first housing including a power actuator for engaging said gate for urging said gate from one to another of said positions of said gate, said second housing including a spring actuator for urging said gate from said other to said one of said positions of said gate, said spring actuator including a stem having a first and second ends, said first end rotatably connected to said tailrod, a spring retainer connected to a spring compression plate, said first end threadably connected to the inner bore of said spring retainer, and a spring.
the method of comprising the steps of:
laterally moving said gate from said one to said another of said positions,
laterally moving said gate from said another to said one of said positions, 7. A method as set forth in claim 6 wherein said second end is keyed to and slidably received within a stem protector, said stem protector is rotatably mounted on said second housing.

8. A method as set forth in claim 6 further comprising the steps of:
rotating and laterally moving said stem to laterally move said gate from said one to said another of said positions,
rotating and laterally moving said stem in an opposite direction to laterally move said gate from said another to said one of said positions.

9. A method as set forth in claim 7 further including the steps of:
rotating said stem protector in a first direction to laterally move said gate from said one to said another of said positions,
rotating said stem protector in a second direction to laterally move said gate from said other to said one of said positions.

10. A method as set forth in claim 8 wherein said first end includes a T-shaped slot for receiving a T-shaped connector on said tail rod.

11. A combination comprising:
a valve body disposed on a flowline,
a valve chamber located within said valve body,
said valve chamber including a tail rod for engaging a gate, said gate disposed within said valve chamber and movable between open and closed positions for controlling the flow of fluids through said flowline,
first and second housings disposed on opposite sides of said valve body,
said first housing including a power actuator for engaging said gate for urging said gate from one to another of said positions of said gate,
said second housing including a spring actuator for urging said gate from said other to said one of said positions of said gate,
said spring actuator including a stem having first and second ends,
a spring retainer connected to a compression plate, said first end of said stem threadably connected to an inner bore of said spring retainer and rotatably connected to said tail rod.

12. A combination as set forth in claim 11 wherein said second end is slidably received within and is keyed to a stem protector, said stem protector is rotatably mounted to said second housing.

13. A combination as set forth in claim 11 wherein said tail rod includes a T-shaped end, said first end includes a T-shaped slot, wherein said T-shaped end is received within said T-shaped slot.

14. A method of operating a fail-safe valve comprising:

a valve body disposed on a flowline, a valve chamber located within said valve body, said valve chamber includes a tail rod for engaging a gate, said gate disposed within said chamber and movable between open and closed positions for controlling the flow of fluids through said flowline, first and second housings disposed on opposite sides of said valve body, said first housing including a power actuator for engaging said gate for urging said gate from one to another of said positions of said gate, said second housing includes a spring actuator for urging said gate from said other to said one of said positions of said gate and a stem having first and second ends, said first end rotatably connected to said tail rod, a spring retainer connected to a spring compression plate, said first end threadably connected to an inner bore of said spring retainer, and a spring, the method comprising the steps of:

laterally moving said gate from said one to said another of said positions by said power actuator, laterally moving said gate from said other to said one of said positions by said spring actuator.

15. A method as set forth in claim 14 wherein said second end is slidably received within and keyed to a stem protector, said stem protector is rotatably mounted to said second housing.

16. A method as set forth in claim 15 further comprising the steps of:

rotating said stem protector in a first direction to laterally move said gate from said one to said another of said positions, rotating said stem protector in a second direction to laterally move said gate from said another to said one of said positions.

17. A method as set forth in claim 14 further comprising the steps of:

compressing said spring when moving said gate from said one to said another of said positions, laterally moving said gate from said another to said one of said positions by said spring.

18. A method as set forth in claim 14 further comprising the steps of:

rotating and laterally moving said stem to laterally move said gate from said one to said another of said positions, rotating and laterally moving said stem in an opposite direction to laterally move said gate from said another to said one of said positions.

* * * * *